(12) United States Patent
Coran et al.

(10) Patent No.: US 7,094,377 B2
(45) Date of Patent: Aug. 22, 2006

(54) APPARATUS AND METHOD FOR HANDLING AND COOLING PLASTIC PREFORMS

(75) Inventors: Massimo Coran, Spresiano (IT); Matteo Zoppas, Fontanafredda (IT)

(73) Assignee: SIPA S.P.A, Veneto (IT)

( * ) Notice: Subject to any disclaimer, the term of this patent is extended or adjusted under 35 U.S.C. 154(b) by 257 days.

(21) Appl. No.: 10/297,483

(22) PCT Filed: May 25, 2001

(86) PCT No.: PCT/EP01/06022
§ 371 (c)(1),
(2), (4) Date: May 8, 2003

(87) PCT Pub. No.: WO01/94096
PCT Pub. Date: Dec. 13, 2001

(65) Prior Publication Data
US 2003/0170338 A1    Sep. 11, 2003

(30) Foreign Application Priority Data
Jun. 6, 2000    (IT) .......................... PN2000A0036

(51) Int. Cl.
*B29C 45/42* (2006.01)
(52) U.S. Cl. ............... 264/513; 264/537; 425/436 RM; 425/444; 425/534
(58) Field of Classification Search ................ 425/444, 425/534, 547, 556; 264/513, 537
See application file for complete search history.

(56) References Cited

U.S. PATENT DOCUMENTS

| | | | |
|---|---|---|---|
| 4,140,464 A | 2/1979 | Spurr et al. ................. | 425/533 |
| 4,786,455 A * | 11/1988 | Krishnakumar et al. .... | 264/237 |
| 5,772,951 A * | 6/1998 | Coxhead et al. ............ | 264/537 |
| 6,296,473 B1 * | 10/2001 | Ohlmann ..................... | 425/547 |
| 6,607,375 B1 * | 8/2003 | Takada et al. .............. | 425/526 |
| 6,767,203 B1 * | 7/2004 | Coran et al. ................ | 425/534 |

FOREIGN PATENT DOCUMENTS

| | | |
|---|---|---|
| EP | 0534367 | 3/1993 |
| EP | 0813949 A1 | 12/1997 |
| EP | 0947304 A2 | 10/1999 |

* cited by examiner

*Primary Examiner*—Joseph S. Del Sole
*Assistant Examiner*—Emmanuel S. Luk
(74) *Attorney, Agent, or Firm*—Wenderoth, Lind & Ponack, L.L.P.

(57) ABSTRACT

Apparatus for handling and cooling preforms, comprising a collection element provided with a plurality of receptacles arranged according to a definite geometrical distribution pattern and adapted to accommodate a corresponding plurality of preforms, as well as a cooling element. The collection element is displaceable from a preform loading position to several distinct positions, arranged above the cooling element, which is provided with a plurality of cups collected into a plurality of distinct, but similar geometrical distribution patterns that are translated with respect to each other in such a manner as to prevent them from interfering with each other. The collection element can be selectively positioned in a number of such positions as to ensure that, in each one of said positions, the geometrical distribution pattern of the receptacles comes to be placed exactly above a specific geometrical distribution pattern of the cups, so that the preforms are capable of falling from the receptacles exactly into respective cups.

18 Claims, 13 Drawing Sheets

APPARATUS AND METHOD FOR HANDLING AND COOLING PLASTIC PREFORMS

This application is a National Stage application of PCT/EP01/06022, filed May 25, 2001.

DESCRIPTION

The present invention refers to a high-output, high-productivity plant for production of plastic items, i.e. so-called "preforms", and in particular the present invention applies in a preferred manner to machines adapted for molding at the same time a plurality of such so-called "preforms", that are intended for processing by blow molding into appropriate final containers, especially plastic bottles.

The present invention represents a simplified variant of the invention described in Italian patent application no. PN2000A000006 filed on Jan. 26th, 2000 by this same Applicant.

As a result, description of the background of the invention, state of the art and problems connected therewith are set forth exhaustively in the above cited Italian patent application and shall not be repeated here for reasons of conciseness.

A solution proposed in the above cited patent application has actually turned out as being extremely effective in production of preforms only, but not in production of finished blow-molded containers. In other words, the solution disclosed in the patent application is characterized by a high capacity in cooling the preforms before release thereof, and this is exactly a constraining element in a preform production plant.

Such a kind of solution can most obviously be used in a so-called single-stage or single-step production plant, but in this case it should be duly taken into account that the preforms are of course required to be cooled down to a far lesser extent, since they must subsequently be again conditioned, i.e. brought up to a temperature of approximately 105° C. for blow molding.

It therefore can be readily appreciated that such a solution appears to be rather exuberant if seen against a result which is actually aimed at. If the fact is then considered that such a solution turns out ultimately as being considerably complicated under all viewpoints and, therefore, quite cost-intensive and demanding, it can further be readily appreciated that it is not capable of allowing for an optimization of a single-stage plant, which would rather receive a much greater advantage from implementation of a less complicated solution, even if the latter would prove less adapted to cool down in a very short time preforms as they come out of an injection mold.

A need also arises for another main drawback to be considered in this connection, i.e. the fact that the solution described in the above cited patent application is not generally adapted to be installed or integrated in modern single-stage plants owing to a lack of space, and this circumstance is such as to therefore be prejudicial to utilization thereof in such kind of plants, even if its poor advantageous character in such particular application is left out of consideration.

Known from the disclosure in US RE. 33,237 is a plant for production of generally hollow items of plastic material, but substantially of injection-molded preforms, as this is explained in the first lines of the related description. Disclosed in this patent publication is in particular a construction solution that consists in providing a plate provided with appropriate cooling cups for respective preforms, and substantially characterized in that two half-molds that produce such preforms are alternately opened and moved away from each other to allow for removal of the same preforms therefrom. An extent to which the half-molds are moved away from each other is such as to allow for a plate with all its cooling cups to be directly introduced between the two half-molds when these are fully opened apart.

This enables the preforms to be transferred directly from an injection mold to the cup-carrying plate, thereby cutting down on operation time required and simplifying construction of the plant itself.

This solution, however, can only be adopted in connection with plants that allow for such a kind of preform cooling plate to be introduced between injection half-molds, while it most clearly cannot be used in those plants which feature such construction and operational restraints as to practically exclude such a possibility.

It is therefore desirable, and it is actually a main purpose of the present invention, to provide a plant and a respective process which are adapted to implement and carry out a preform cooling-down phase under a sensible reduction during a length of an original cycle time, prove to be particularly efficient and advantageous when used in connection with a single-stage plant, are capable of doing away with the above described drawbacks, are reliable and capable of being easily implemented using readily available and, therefore, cost-effective materials and techniques.

Such an aim of the present invention, along with further features thereof, is reached in a plant that is made and operates as recited in the appended claims.

BRIEF DESCRIPTION OF THE DRAWINGS

The present invention may take the form of a preferred, although not sole embodiment such as the one that is described in detail and illustrated below by way of a non-limiting example with reference to the accompanying drawings, in which.

DETAILED DESCRIPTION OF THE PREFERRED EMBODIMENTS

Figure 1:
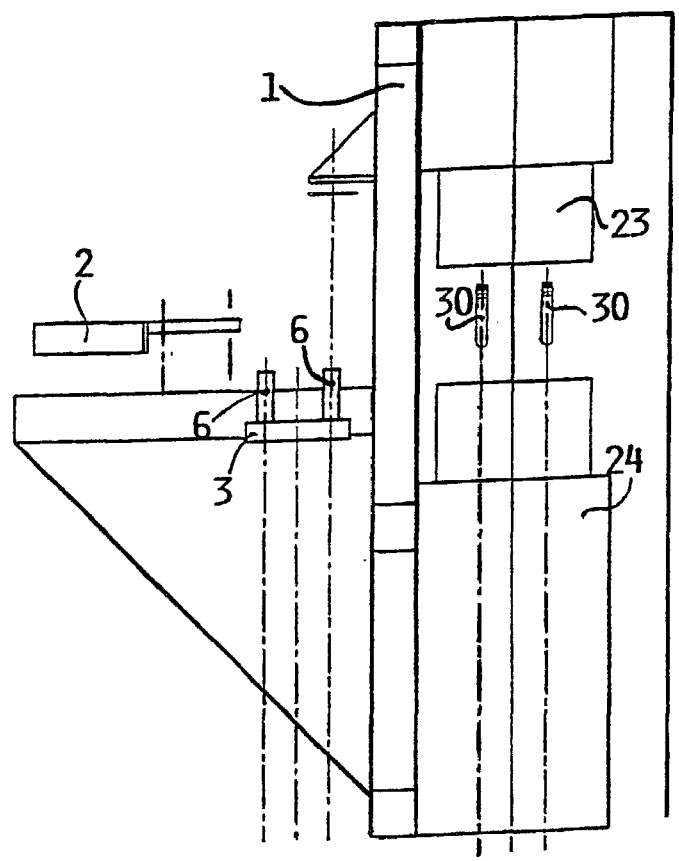
FIGS. 1 and 1a are a vertical projection view and a plan view according to an A—A section, respectively, of a plant according to the present invention, in a definite phase of operation thereof.

With reference to the above listed Figures, a plant according to the present invention comprises:

a load-bearing structure 1, a collection element 2;

a plurality of receptacles 10 provided in the collection element 2; and a cooling structure 3, provided with a plurality of cooling cups 6 adapted to accommodate respective preforms for pre-determined periods of time and then to release them on to other preform handling structure.

For greater representation simplicity, in the FIGS. 1 through to 12a the receptacles 10 and the cups 6 are symbolically represented only by intersecting points of axes determining positions thereof.

Figure 6:
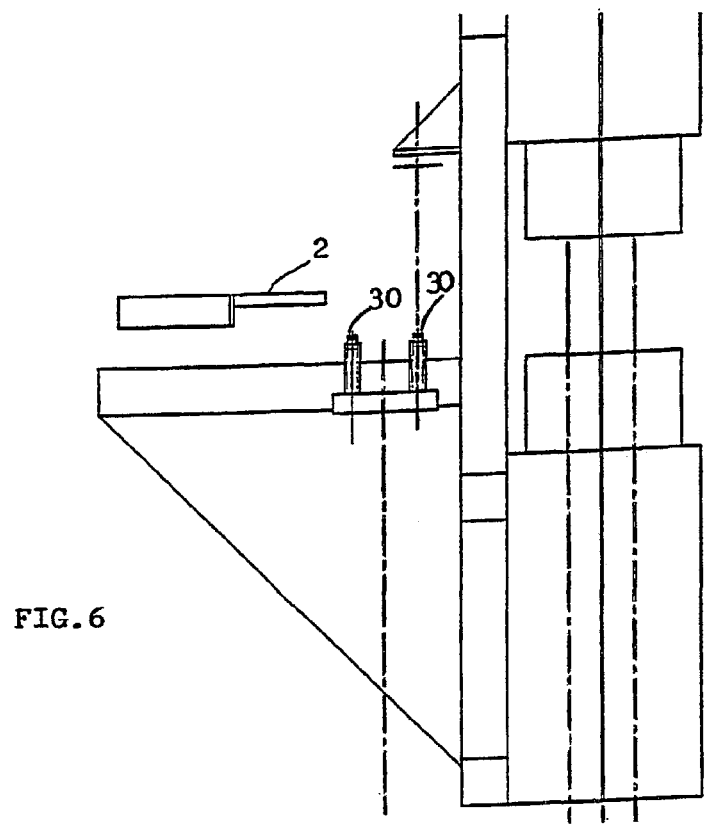
Figure 12:
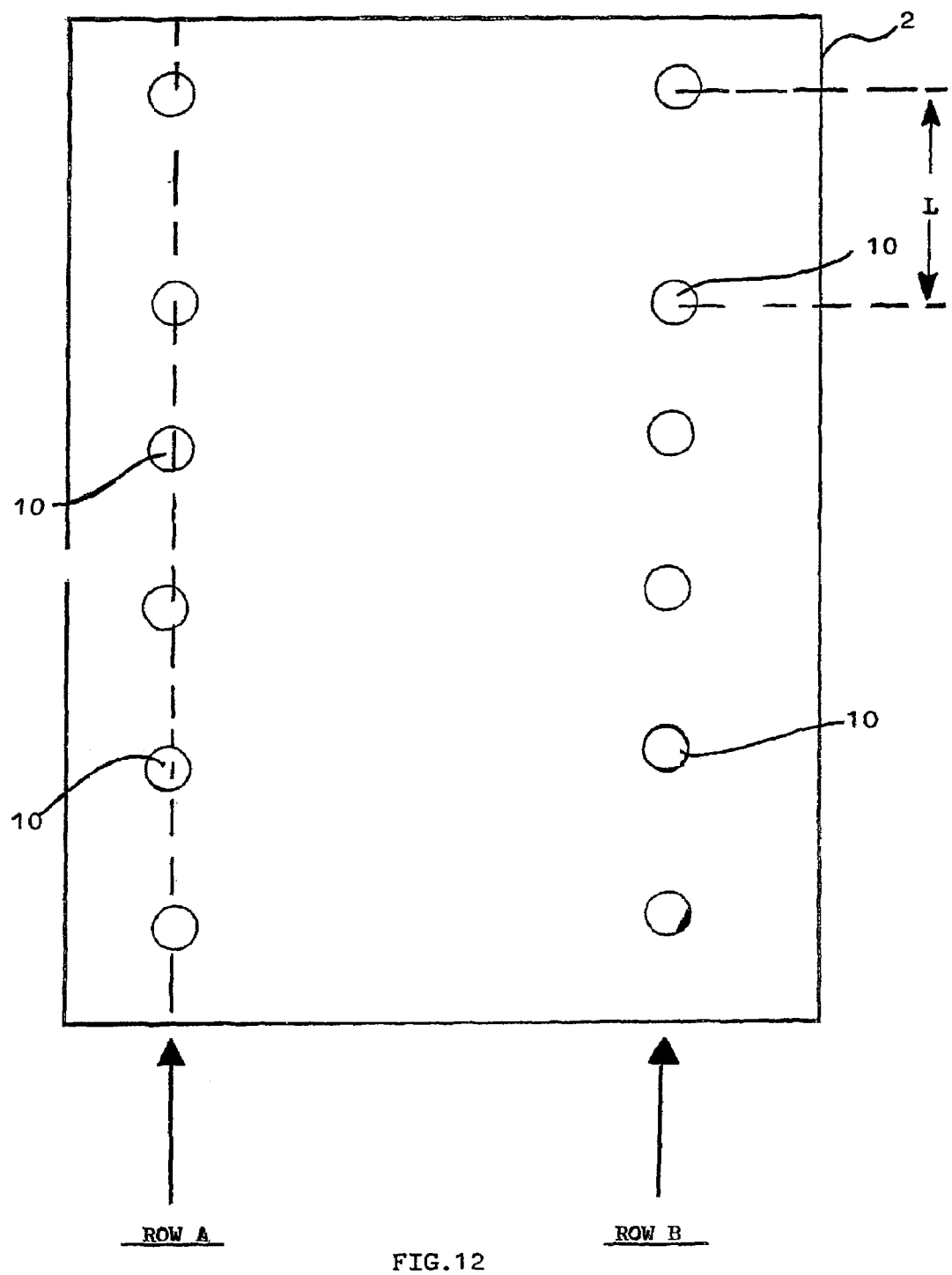
FIG. 12 is a more detailed top view of a component part of the plant according to the present invention.

The collection element 2 is provided with structure (not shown in the Figures) which makes it capable of performing a horizontal motion that carries it alternately:

from a position inside a gap created between two opened horizontal half-molds 23, 24 (see FIG. 12)

to a position situated outside such a gap and above the cooling structure 3 in such a manner as to enable preforms 30 that are retained in the receptacles 10 to fall by gravity down into respective ones of the cups 6, in a manner and with structure that will be described in greater detail further on, to a third external all-out position (see FIG. 1 and FIGS. 6 through to 11), in which the element 2 is further displaced into such a position as to leave a space above the cooling structure 3 completely free, and vice-versa, from this external all-out position again to an initial position between the two half-molds.

The receptacles 10 provided in the collection element 2 are preferably distributed according to the following geometric pattern: with reference to FIG. 12, which is a more detailed top view of the collection element 2, the receptacles 10 are arranged along two rows A and B, in which they are aligned and equally spaced from each other.

In order to be able to better develop a continuation of this description, an overall geometry defined by a totality of the receptacles 10 in the collection element 2 will be defined as "distribution pattern", while preforms produced and at the same time introduced in the receptacles, and therefore arranged in the same so defined distribution pattern, are referred to as "cluster".

In an advantageous manner, and towards a purpose of making the most out of available space, the two rows A and B include a highest possible number of receptacles 10 as allowed by a length of the rows themselves, owing to reasons that will explained in greater detail further on.

Figure 13:
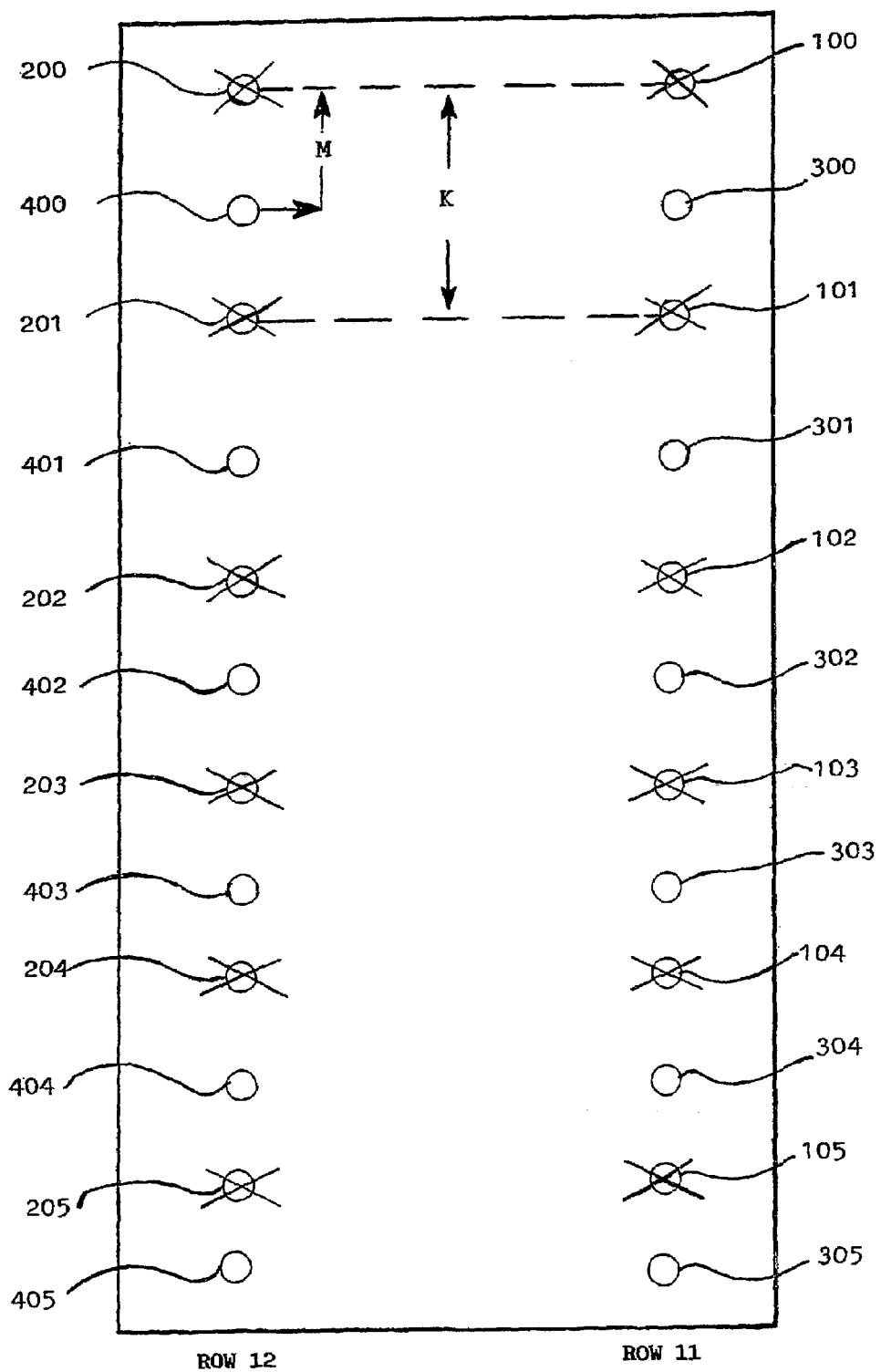
FIG. 13 is a more detailed top view of a second component part of the plant according to the present invention.

With reference to FIG. 13, the cooling structure 3 comprises in turn two distinct and parallel rows 11, 12 of cups, in which the cups of both rows are generally arranged according to two distinct distribution patterns, each one of which is equal to the distribution pattern of the receptacles 10.

In other words, a first distribution pattern comprises both the cups identified by numerals 100 through to 105 in row 11, and the cups identified by numerals 200 through to 205 in row 12.

Similarly, a second distribution pattern comprises both the cups identified by numerals 300 through to 305 in row 11, and the cups identified by numerals 400 through to 405 in row 12.

The row of receptacles in the element 2 can therefore be arranged selectively, using per se known structure, above the cups comprised in one of the two just above described and illustrated distinct distribution patterns.

This most obviously enables the element 2 to be loaded with respective preforms, and for successive cycles, all of the cups 6 arranged on the cooling structure 3, while each time unloading a successive cluster of preforms onto a different distribution pattern of cups by simply displacing and arranging in an appropriate position the cooling structure 3, in such a manner as to ensure that each distribution pattern of cooling cups 6 is enabled to alternately arrange itself under the distribution pattern provided in the collection element 2.

Since the task of the receptacles is to:

intercept preforms released from the upper half-mould 23, collect the preforms in an orderly manner and orientate them vertically, i.e. with their neck portion or opening turned upwards, transfer them above the cooling structure 3, and finally let them fall into respective cups, with use of such structure and techniques as generally known in the art, the receptacles and, more generally, the element 2 are provided with appropriate structure that is adapted to selectively retain single clusters of preforms falling down from above, and to release them downwards.

Also well-known to all those skilled in the art is the fact that, owing to reasons that shall not be recalled here due to them being so widely known, a central distance between preforms of a same cluster during injection moulding is quite different from and, in particular, quite smaller than a central distance between the same preforms before and during a blow-molding step.

Existence is further well-known of particular devices and operating modalities, which are generally known under the term of "pitch change" or "variable-pitch" facility and are adapted to widen the central distance between preforms in order to reach a new pitch as required by the blow-molding operation.

It therefore becomes advantageous for a possibility of implementing both accelerated cooling of preforms removed at the same time from an injection mold and the above cited pitch-change operation to be brought together into a single plant and related process.

Such a result can be reached in a plant as illustrated in particular in FIGS. 12 and 13, in which the collection element 2 contains two rows A and B of preform accommodating receptacles, in which contiguous elements in the same row are separated from each other by a distance "L" that is an optimum distance for injection molding of the preforms, whereas the cooling structure 3 comprises the two rows 11 and 12 of cups, in which however, in row 11, the cups identified by numerals 100 through to 105 are arranged alternately relative to the cups 300 through 305; similarly, in row 12, the cups identified by numerals 200 through to 205 are arranged alternately relative to the cups 400 through 405.

It will also be readily appreciated that, in order to really reach a desired result, the distance "L" between contiguous receptacles in a same row will be the optimum distance required in view of being able to produce preforms without any waste of unused space, whereas distance "K" between the cups arranged in the same distribution pattern and contained in the same row, e.g. the ones indicated at 100 through to 105, will be the optimum distance required as the desired spacing between the preforms during a blow-molding phase, while distance "M" between two adjacent cups, e.g. between the cup 200 and the cup 400, and therefore belonging to two different distribution patterns, can be determined partly arbitrarily, with a sole obvious constraint of keeping it sufficiently smaller than "K".

Readily appreciated can, on the other hand, also be the fact that the structure adapted to implement the above cited "pitch change" facility, i.e. distribution of the preforms of a same cluster to distinct distribution patterns on the cooling structure 3, are known to those skilled in the art, so that they shall not be described here.

Figure 1A:
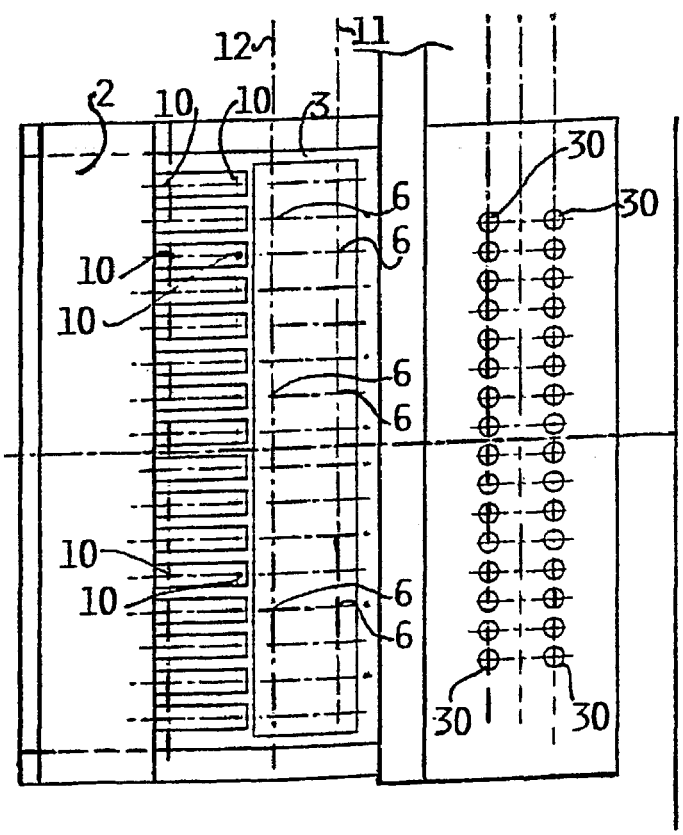
Figure 2:
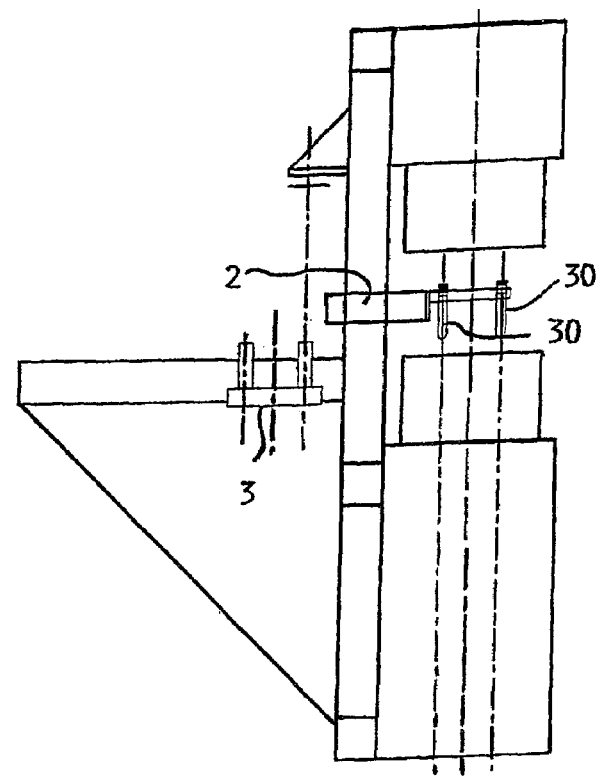
FIGS. 2, 2a . . . and so on through to FIGS. 11 and 11a are corresponding vertical-projection views and plan views according to the same section of the same plant, in successive different phases of operation thereof.
Figure 2A:
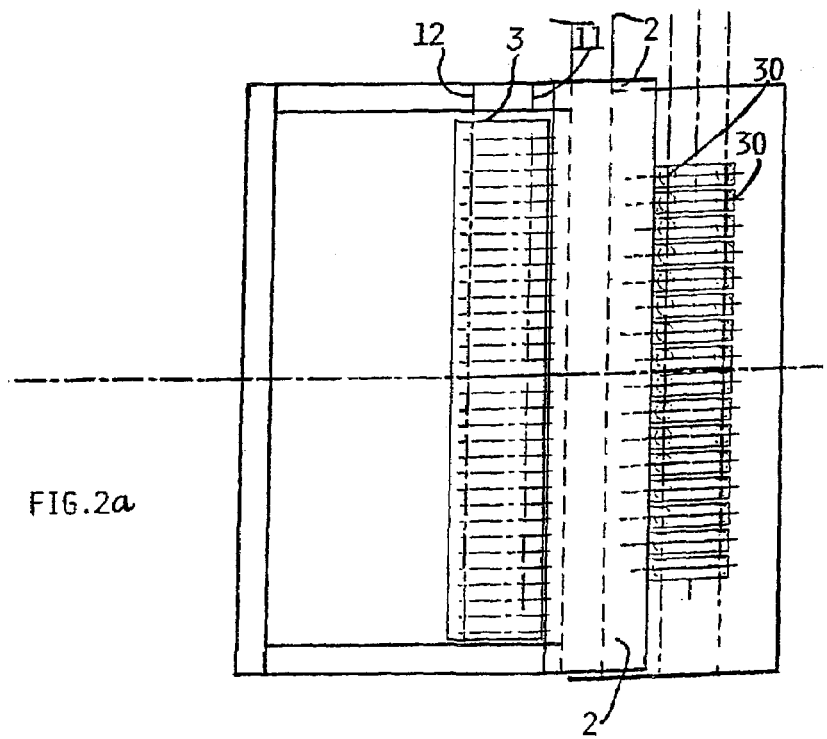
Figure 3:
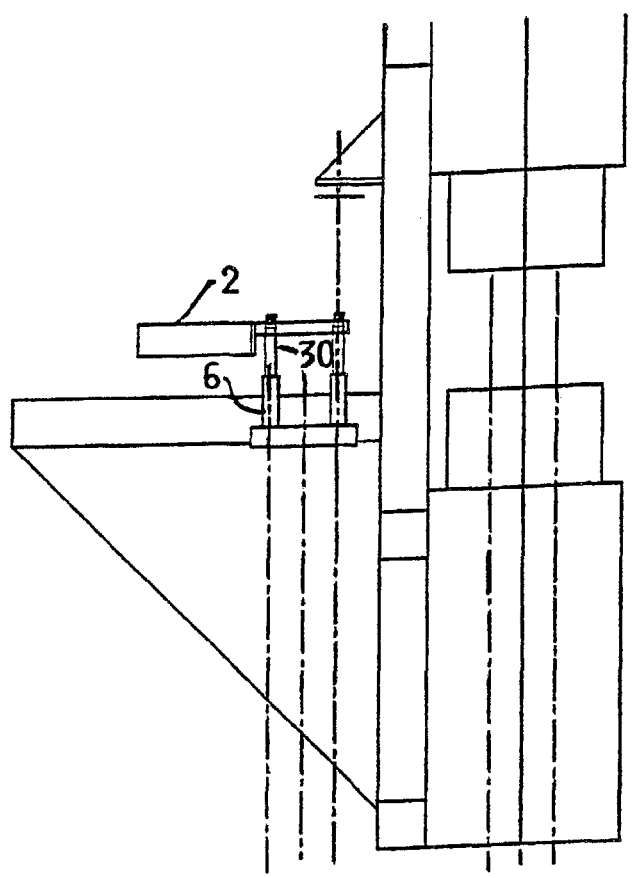
Figure 3A:
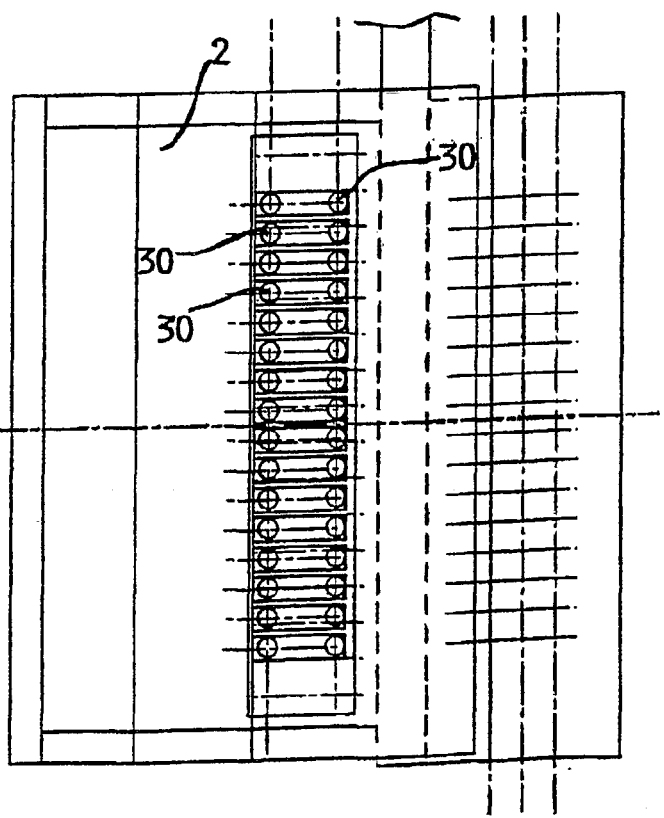
Figure 4:
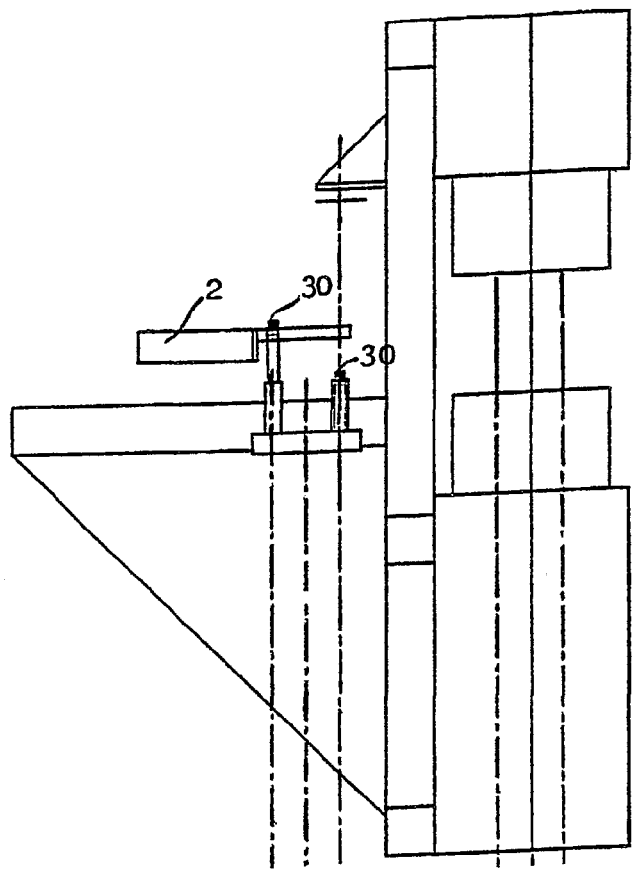
Figure 4A:
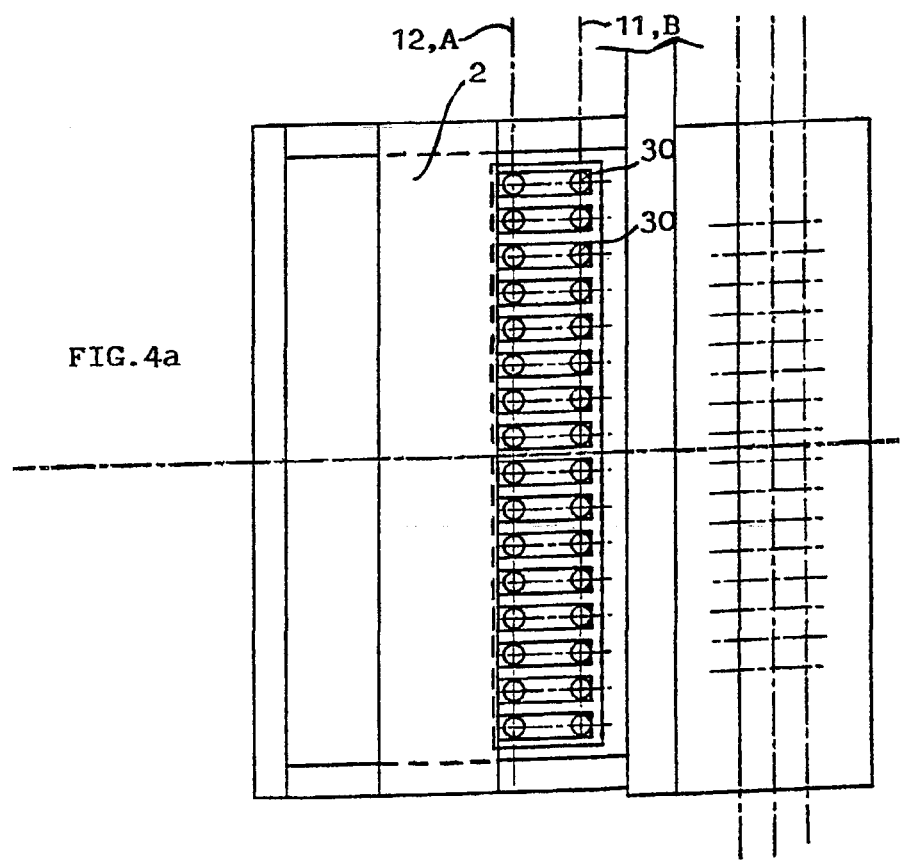
Figure 5:
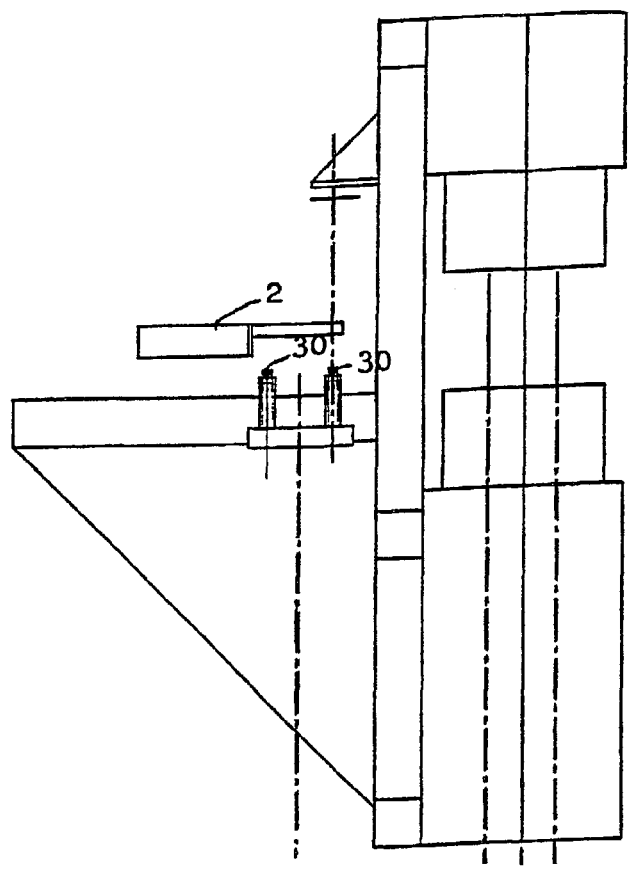
Figure 5A:
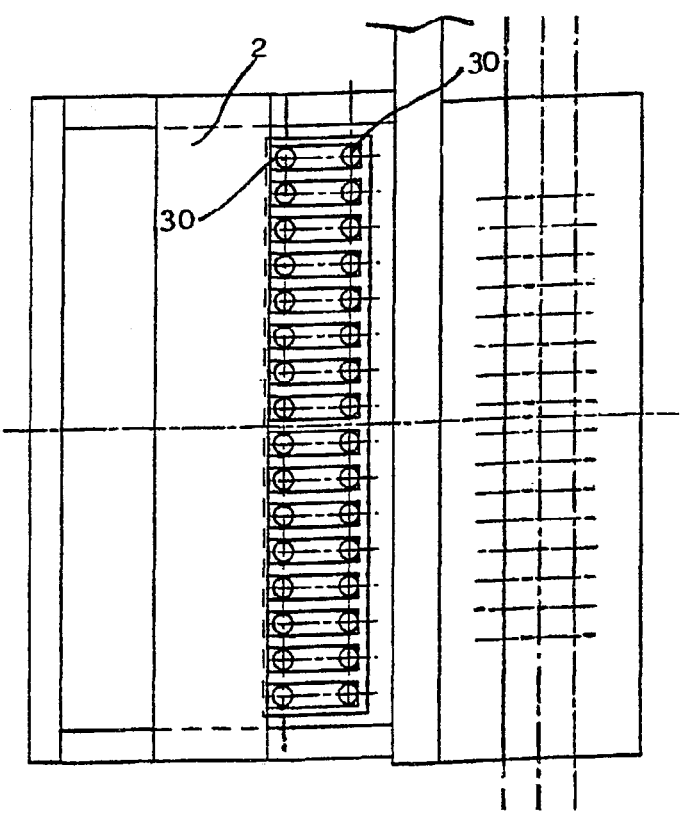
Figure 6A:
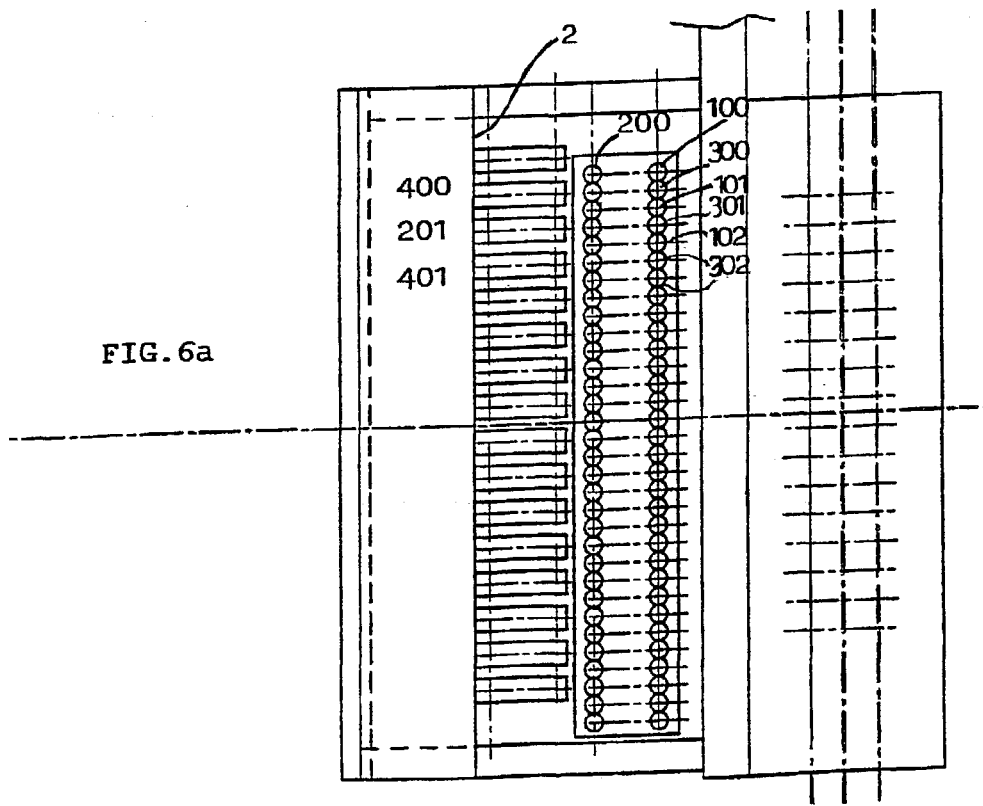

A manner by which the above described and illustrated plant operates will at this point be fully clear. In any event, such operation can be summarized as follows:

during an initial phase of a process, preforms 30 of a same sub-cluster are molded in the half-molds 23 and 24, which are subsequently opened apart, while the receptacles 10 of the element 2 are empty and the latter is still located outside the half-molds 23, 24 (see FIGS. 1, 1a);

in a subsequent phase, the element 2 is inserted between the two half-molds 23 and 24 in such a position as to enable the cluster of preforms, i.e. the preforms that are released from an upper half-mold at the same time, to fall down exactly into a corresponding number of receptacles 10 provided in the element 2 (FIGS. 2 and 2*a*);

during a next phase, the element 2 is transferred above the cooling structure 3 in such a manner as to enable the preforms of a same cluster, as previously loaded in respective receptacles of the element 2, to become disposed above the cups of the first distribution pattern, i.e. from 100 through to 105 and from 200 through to 205, while at the same time undergoing a pitch change process to vary a central distance therebetween (FIGS. 3 and 3*a*);

upon conclusion of the above mentioned phase, for reasons that will be explained in greater detail further on, only the preforms in row B are allowed to fall down into respective cups 6 in row 11 of the cooling structure 3 (FIGS. 4 and 4*a*) and, with reference to FIG. 15, into the cups identified by numerals 100, 101, 102, 103, 104, 105;

during a following phase, and after a pre-determined period of time, only the preforms in row A are in turn allowed to fall down into respective cups 6 in corresponding row 12 on the cooling structure 3 (FIGS. 5, 5*a*) and, with reference to FIG. 15, into the cups identified by numerals 200, 201, 202, 203, 204, 205;

subsequently (FIGS. 6 and 6*a*), the collection element 2 is withdrawn from its position above the cooling structure 3, which is shown with all of its cups filled with respective preforms (also those identified by numerals 300, 301 . . . 305, 400, 401 . . . 405, which have not been filled during immediately preceding phases, so that they should be intended as having been loaded in a previous cycle).

Meanwhile, the preforms that have already been inserted in the cups from 300 through to 305 and 400 through to 405 are regularly cooled to a desired temperature value, and therefore for a pre-determined length of time, after which the same preforms are picked up in sequence and, therefore, in the same order in which they had been inserted in the two distribution patterns comprised in the structure 3 of the given example.

Each cluster of preforms is then sent to a blow-molding process using generally known structure and methods.

In a preferred manner, this structure comprises conveying device 20, such as for instance a sliding conveyor belt, provided with appropriate pick-up devices duly aligned and spaced at a distance "K" from each other so as to be able to exactly engage preforms contained in alternate receptacles comprised in a single row of the structure 3.

Figure 7:
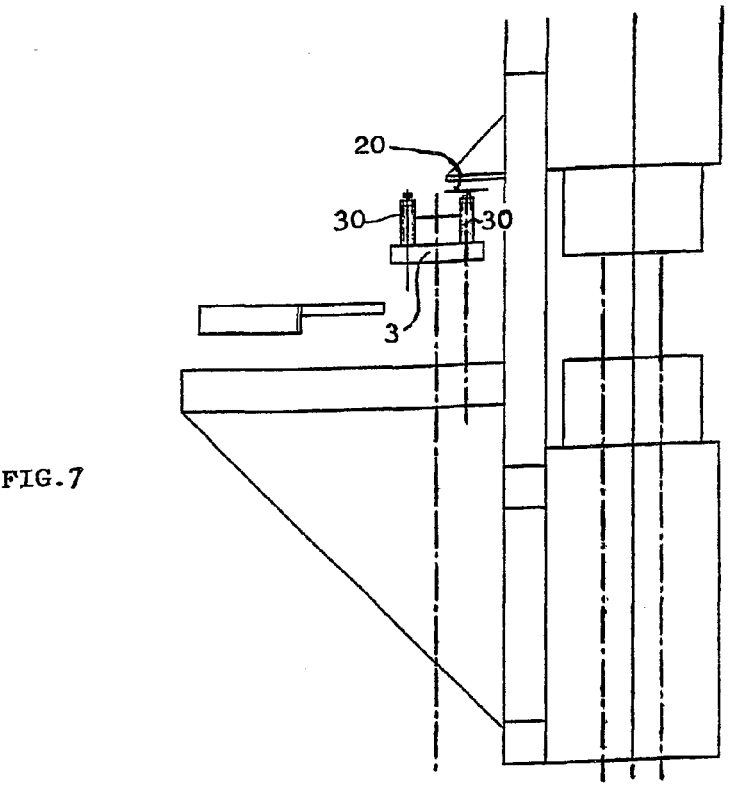
Figure 7A:
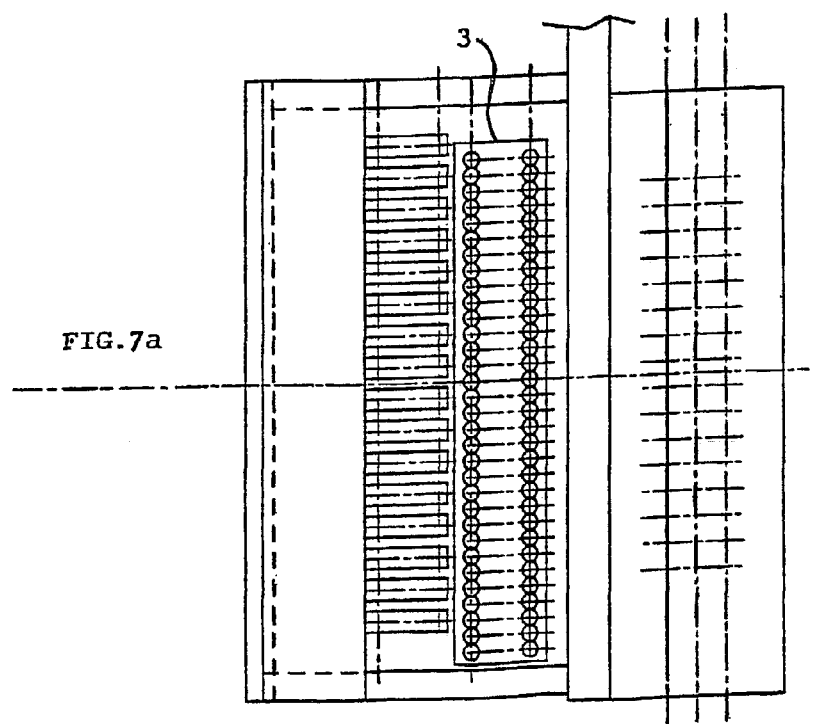

Upon expiration of a period of time provided to allow, say, the preforms that had already been loaded in respective cups 300, 301 . . . 305 in a previous cycle to properly cool, the cooling structure 3 is raised with generally known structure, so that the preforms in the cups are capable of being seized by respective pick-up devices (not shown in the Figures, since well-known in the art) and carried away from conveyor 20 (FIGS. 7, 7*a*).

Figure 8:
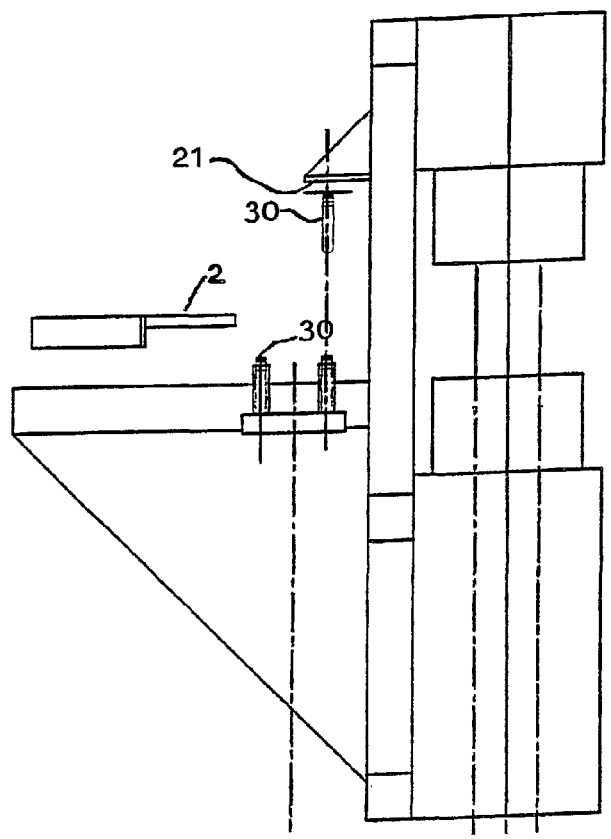
Figure 8A:
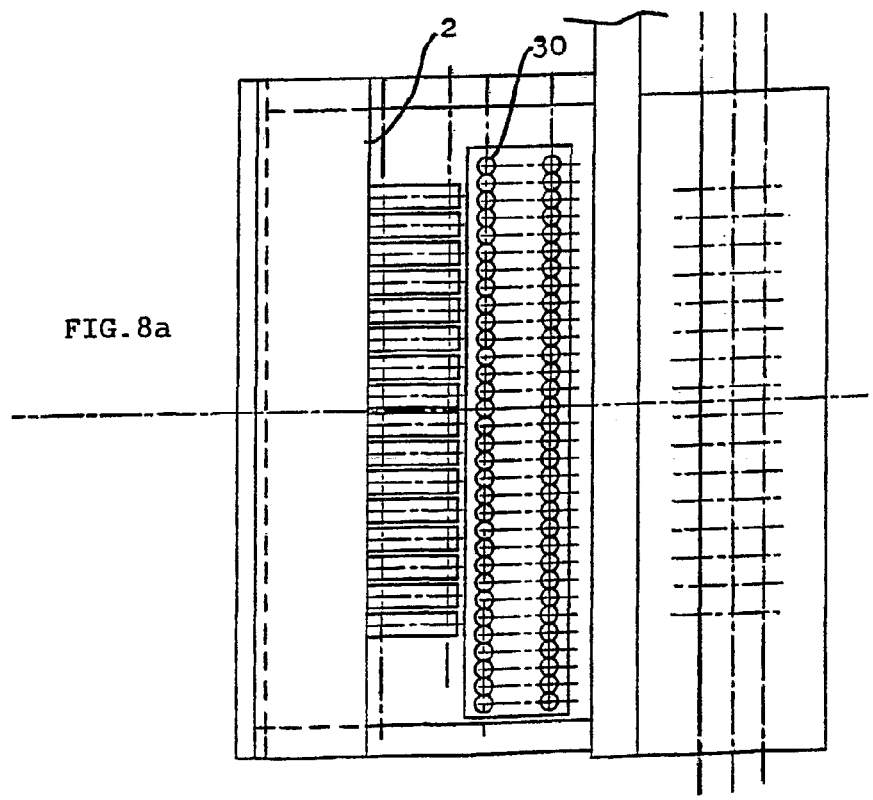
Figure 9:
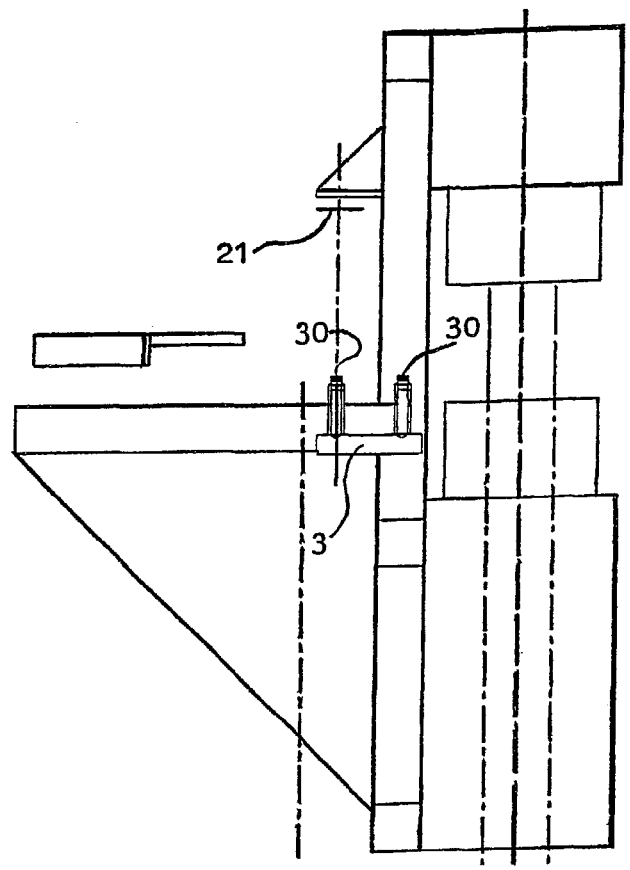
Figure 9A:
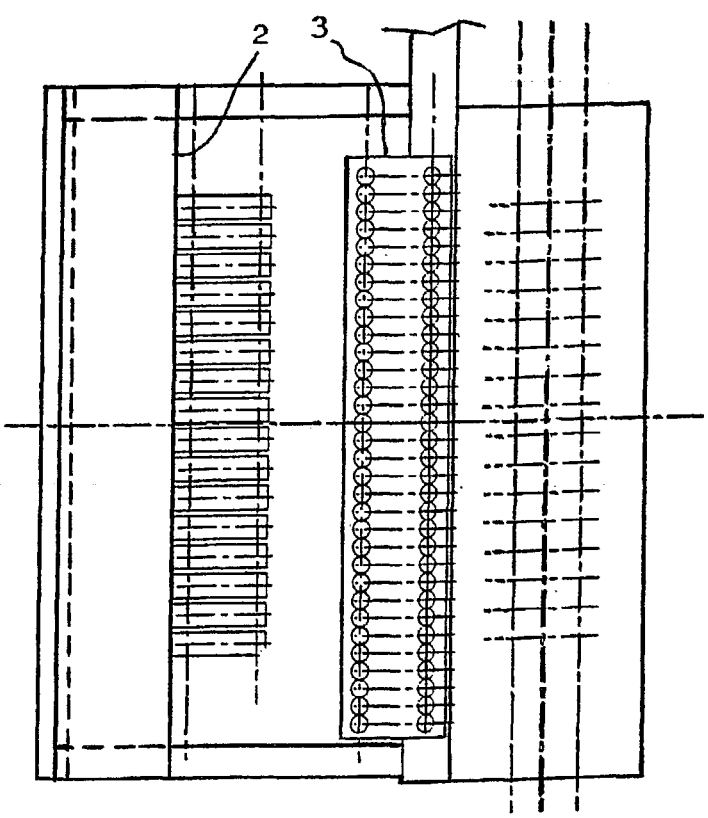
Figure 10:
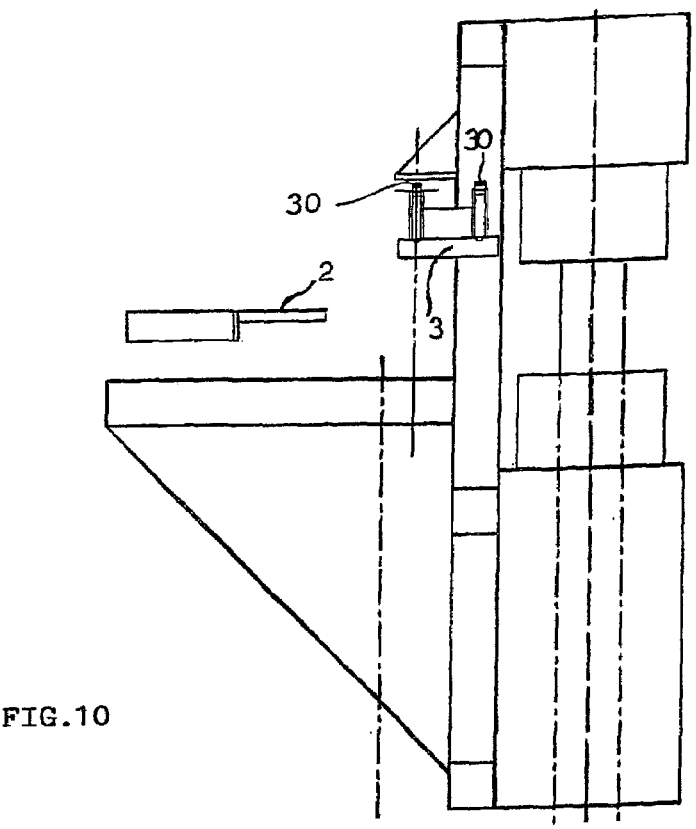
Figure 10A:
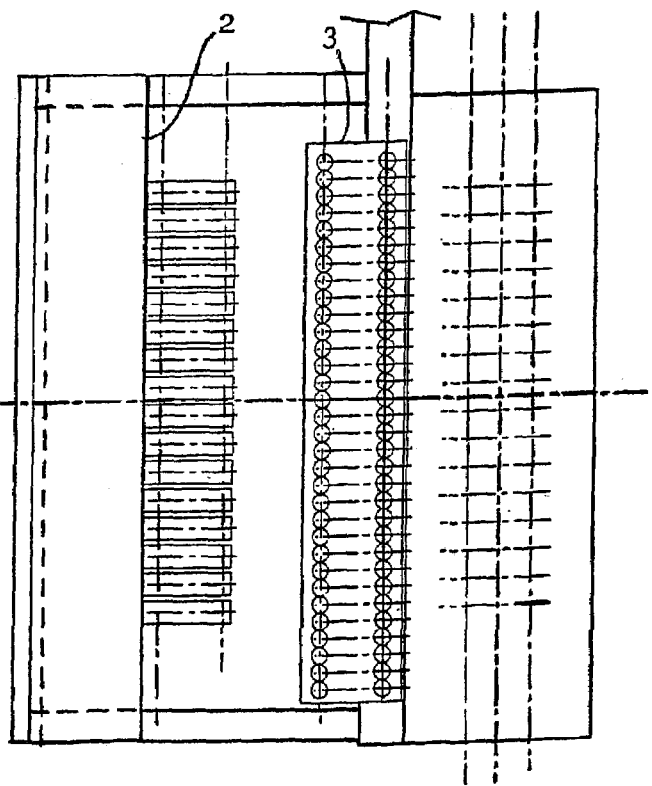

Then, in order to also load the preforms 400 through to 405, as previously inserted in respective cups, the structure 3 is:

lowered (see FIGS. 8, 8*a*);

translated sidewards by an extent which is equal to a distance between rows 11 and 12, so that row 12 becomes aligned with the conveying device 20 (FIGS. 9, 9*a*);

and finally raised again, so that also the preforms 400 through to 405 are seized by respective pick-up devices and conveyed to a next processing station (FIGS. 10, 10*a*).

Figure 11:
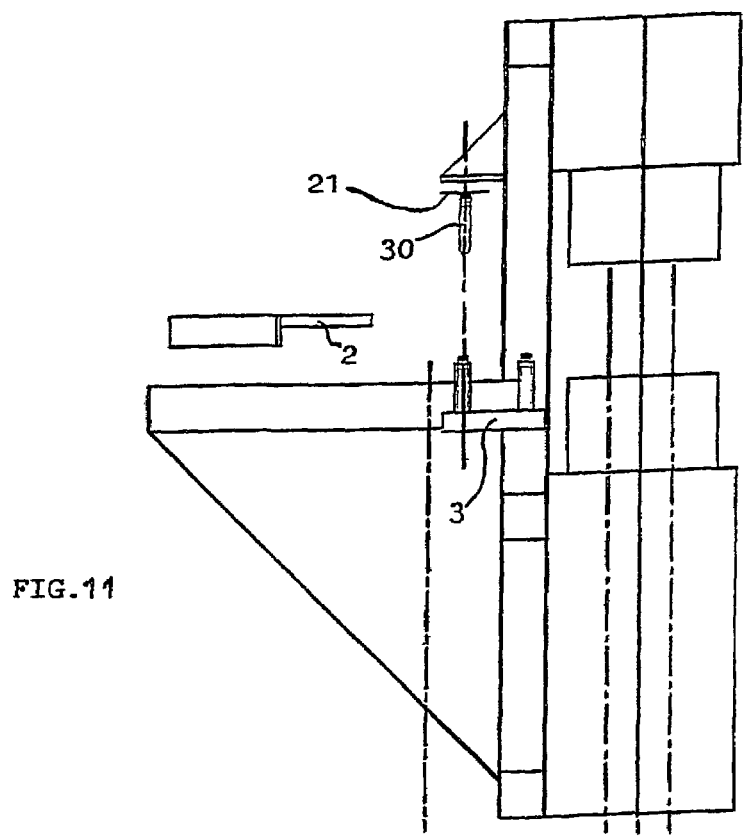
Figure 11A:
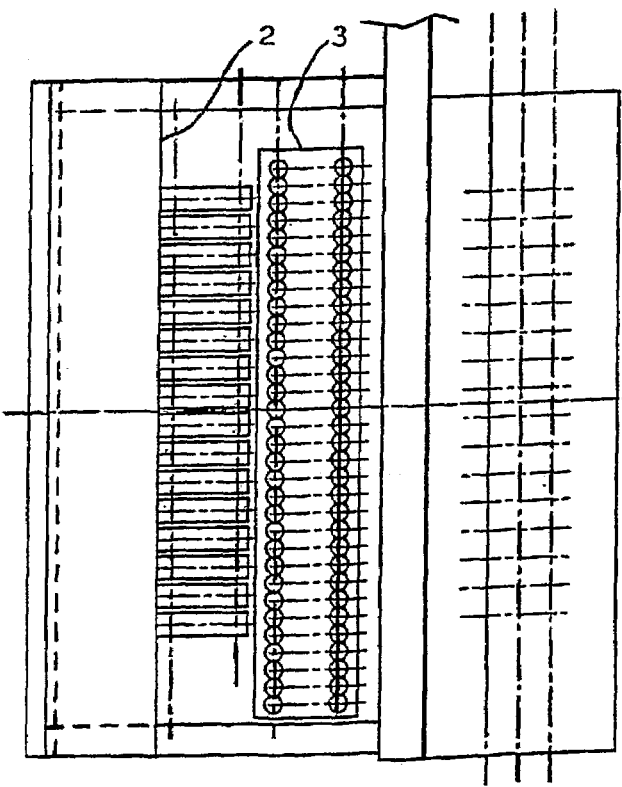

The structure 3 is then lowered again (FIGS. 11, 11*a*), so as to enable a working cycle to be restarted and repeated as illustrated in FIG. 1.

It should however be noticed that, during subsequent phases, preforms of a same cluster are inserted in the cups 300 through to 305 and 400 through to 405, which have just been cleared of respective preforms, wherein the subsequent phases are used to appropriately cool the preforms in just loaded cups 100 through to 105 and 200 through to 205.

In order to be able to load the cups 300 through to 305 and 400 through to 405, considering that the cups between the two distinct distribution patterns are misaligned with respect to each other by a distance "M" as described above, a need arises for the cooling structure 3 to be displaced in the direction of alignment of rows 11 and 12 by an equal extent so that the preforms of a second loading are enabled to become correctly inserted in the respective cups of the second distribution pattern. To this purpose, structure as generally known in the art is provided to impart a translatory, selectively actuatable motion to the cooling structure.

Following this displacement, the element 2 is caused to move back into its initial position so as to allow for loading of cups belonging to the first distribution pattern.

As those skilled in the art will certainly have been able to notice, the cooling structure 3 substantially undergoes three types of motions, namely:

an upward motion to enable the preforms, after cooling thereof, to be seized by respective pick-up devices of the conveying device 20;

a sideward motion to successively bring a first row 11 and then a second row 12 into alignment with the pick-up devices which are in turn provided in an aligned arrangement;

a displacement, in a direction parallel to the rows, by such an extent K as to enable in a first phase the cups in the first distribution pattern, and in a subsequent phase the cups in the second distribution pattern, to be loaded with respective preforms.

It will certainly have also been noticed that a circumstance of letting first the preforms of a row and then the preforms of the second row, belonging to a same distribution pattern, be loaded onto respective pick-up devices, involves that different cooling times should be provided for each row, if the cups are filled at the same time.

However, since no cooling unevenness and, therefore, temperature unevenness is acceptable among preforms in a continuous production environment and, in particular, in a single-stage plant, a need ensues for the cooling times to be levelled off. This is obtained by loading row 11 with hot preforms at a certain instant, and then loading the cups of row 12 with respective preforms only after a pre-determined period of time has elapsed therefrom.

Such a delay can be obtained with various structure that is generally known in the art, so that it shall not be dealt with here any further.

Those skilled in the art will therefore be able to readily appreciate that the described solution effectively enables a plurality of preforms, as appropriately gathered into a number of distinct distribution patterns, to be accommodated in a very limited space duly fitted for cooling the preforms. In fact, if a number of distribution patterns available on cooling structure 3 altogether is indicated as n, and if a total duration of a cooling-down phase of the preforms is for technical reasons pre-set at T, it will be obvious that it is possible for a release of preforms to be obtained every period T/n.

It is therefore to such a same period T/n that time, i.e. duration, of an elementary cycle including preform injection, solidification and removal from a mold can be actually brought down to; and, therefore, preform cooling-down time can be suitably reduced, this being allowed for by a possibility for preforms to be knocked out when still sufficiently hot for a subsequent blow-molding phase, as compared with a solution and constraints of a revolving-turret plant described in the afore-cited patent application No. PN2000A000006.

The invention claimed is:

1. An apparatus for handling and cooling preforms produced in an injection mold, comprising:
    a collection element having a surface in which there are receptacles adapted to respectively accommodate preforms ejected from an injection mold consisting of two half-molds; and
    a cooling element having cups adapted to accommodate and cool preforms, said cups being arranged in a first distribution pattern and a second distribution pattern such that said cups arranged in said first distribution pattern do not interfere with said cups arranged in said second distribution pattern,
    wherein said collection element is constructed and arranged to move between a first position situated between the two half-molds when in an opened condition, so as to have said receptacles accommodate preforms ejected from one of the two half-molds, and a second position lying substantially adjacent said cooling element, and
    wherein said cooling element is constructed and arranged to
        (i) have the preforms, once accommodated in said receptacles, be received within said cups arranged in said first distribution pattern, and then
        (ii) move by an extent in a first direction such that other preforms, subsequently accommodated in said receptacles, become aligned with said cups arranged in said second distribution pattern so as to be receivable therein,
        (iii) move in a second direction, transverse to the first direction, so as to sequentially bring corresponding ones of said cups arranged in said first distribution pattern into alignment with corresponding pick-up structure, and so as to subsequently sequentially bring corresponding ones of said cups arranged in said second distribution pattern into alignment with corresponding pick-up structure, and
        (iv) move in a third direction, orthogonal to the first direction and the second direction, to enable the preforms in said corresponding ones of said cups arranged in said first distribution pattern to be seized by said corresponding pick-up structure associated with said corresponding ones of said cups arranged in said first distribution pattern, and to subsequently enable the preforms in said corresponding ones of said cups arranged in said second distribution pattern to be seized by said corresponding pick-up structure associated with said corresponding ones of said cups arranged in said second distribution pattern.

2. The apparatus according to claim 1, wherein said collection element is also constructed and arranged to move to a third position, away from the first and second positions.

3. The apparatus according to claim 2, wherein said receptacles are arranged in two rows,
said cups are arranged in said first distribution pattern by being arranged in two rows, and
said cups are arranged in said second distribution pattern by being arranged in two rows,
with said cups in one row of said first distribution pattern and said cups in one row of said second distribution pattern being aligned with one another so as to define a first composite row of cups, and
with said cups in the other row of said first distribution pattern and said cups in the other row of said second distribution pattern being aligned with one another so as to define a second composite row of cups,
such that said cooling element is constructed and arranged to move in the second direction so as to sequentially bring corresponding ones of said cups arranged in said first distribution pattern into alignment with corresponding pick-up structure and so as to subsequently sequentially bring corresponding ones of said cups arranged in said second distribution pattern into alignment with corresponding pick-up structure, by being constructed and arranged to move in said second direction so as to,
    during a first phase
        (i) bring said cups of said first composite row corresponding to said first distribution pattern into alignment with associated pick-up structure, and then
        (ii) bring said cups of said second composite row corresponding to said first distribution pattern into alignment with associated pick-up structure, and
    during a subsequent second phase
        (iii) bring said cups of said first composite row corresponding to said second distribution pattern into alignment with associated pick-up structure, and then
        (iv) bring said cups of said second composite row corresponding to said second distribution pattern into alignment with associated pick-up structure,
whereby said cooling element is constructed and arranged to move in the third direction to enable the preforms in said corresponding ones of said cups arranged in said first distribution pattern to be seized by said corresponding pick-up structure associated with said corresponding ones of said cups arranged in said first distribution pattern and to subsequently enable the preforms in said corresponding ones of said cups arranged in said second distribution pattern to be seized by said corresponding pick-up structure associated with said corresponding ones of said cups arranged in said second distribution pattern, by being constructed and arranged to move in the third direction so as to,
    during the first phase
        (i) enable the preforms, in said cups of said first composite row corresponding to said first distribution pattern, to be seized by the associated pick-up structure corresponding to said cups of said first composite row corresponding to said first distribution pattern, and then
        (ii) enable the preforms, in said cups of said second composite row corresponding to said first distribution pattern, to be seized by the associated pick-up structure corresponding to said cups of said second composite row corresponding to said first distribution pattern, and
    during the subsequent second phase
        (iii) enable the preforms, in said cups of said first composite row corresponding to said second distribution pattern, to be seized by the associated pick-up structure corresponding to said cups of said first composite row corresponding to said second distribution pattern, and then (ii) enable the preforms, in said cups of said second composite row corresponding to said second distribution pattern, to be seized by the associated pick-up structure corresponding to said cups of said second composite row corresponding to said second distribution pattern.

4. The apparatus according to claim 3, wherein said collection element is horizontally arranged and said receptacles are in an upper surface of said collection element, said collection element is constructed and arranged to move between the first position and the second position by moving rectilinearly between the first position and the second position such that at the second position said collection element lies substantially above said cooling element, said cooling element is constructed and arranged to move by the extent in the first direction by moving by the extent in a direction parallel to said first and second composite rows, and said cooling element is constructed and arranged to move in the third direction by being constructed and arranged to move upwardly.

5. The apparatus according to claim 4, further comprising:

a device for selectively modifying a pattern of said receptacles so as to make the pattern identical to said first distribution pattern, make the pattern identical to said second distribution pattern, and make the pattern different from each of said first distribution pattern and said second distribution pattern.

6. The apparatus according to claim 5, wherein an amount of cups in said one row of said first distribution pattern is equal to an amount of cups in said other row of said first distribution pattern, and an amount of cups in said one row of said second distribution pattern is equal to an amount of cups in said other row of said second distribution pattern.

7. The apparatus according to claim 6, wherein said cups of said one row of said first distribution pattern in said first composite row are alternately arranged with respect to said cups of said one row of said second distribution pattern in said first composite row, and said cups of the other row of said first distribution pattern in said second composite row are alternately arranged with respect to said cups of the other row of said second distribution pattern in said second composite row.

8. A method comprising:

injection molding first preforms in a mold consisting of closed half-molds;

opening said mold by separating said half-molds;

inserting a collection element, having a surface in which there are receptacles, between said half-molds;

releasing said first preforms from one of said half-molds such that said first preforms are accommodated within said receptacles, respectively;

transferring said collection element to a position adjacent a cooling element having cups arranged in a first distribution pattern consisting of two rows;

releasing said first preforms from said receptacles such that some of said first preforms are received within said cups in one of said two rows, and subsequently other of said first preforms are received within said cups in the other of said two rows; and moving said cooling element such that second preforms, accommodated within additional cups of said cooling element arranged in a second distribution pattern, are seized by pick-up structure of a conveyor.

9. The method according to claim 8, wherein moving said cooling element comprises vertically moving said cooling element.

10. A method comprising:

injection molding first preforms in a mold consisting of closed half-molds;

opening said mold by separating said half-molds;

inserting a collection element, having a surface in which there are receptacles, between said half-molds;

releasing said first preforms from one of said half-molds such that said first preforms are accommodated within said receptacles, respectively;

transferring said collection element to a position adjacent a cooling element having cups arranged in a first distribution pattern and a second distribution pattern such that said cups arranged in said first distribution pattern do not interfere with said cups arranged in said second distribution pattern;

releasing said first preforms from said receptacles such that said first preforms are received within said cups arranged in said first distribution pattern;

injection molding second preforms in said mold consisting of said closed half-molds;

opening said mold by separating said half-molds;

inserting said collection element between said half-molds;

releasing said second preforms from said one of said half-molds such that said second preforms are accommodated within said receptacles, respectively;

transferring said collection element to a position adjacent said cooling element;

moving said cooling element by an extent in a first direction such that said second preforms become aligned with said cups arranged in said second distribution pattern; and releasing said second preforms from said receptacles such that said second preforms are received within said cups arranged in said second distribution pattern.

11. The method according to claim 10, further comprising:

moving said cooling element in a second direction, transverse to said first direction, thereby sequentially bringing corresponding ones of said cups arranged in said first distribution pattern into alignment with corresponding pick-up structure of a conveyor, and thereby subsequently sequentially bringing corresponding ones of said cups arranged in said second distribution pattern into alignment with corresponding pick-up structure of said conveyor; and moving said cooling element in a third direction, orthogonal to said first direction and said second direction, and causing said first preforms in said corresponding ones of said cups arranged in said first distribution pattern to be seized by said corresponding pick-up structure associated with said corresponding ones of said cups arranged in said first distribution pattern, and subsequently causing said second preforms in said corresponding ones of said cups arranged in said second distribution pattern to be seized by said corresponding pick-up structure associated with said corresponding ones of said cups arranged in said second distribution pattern.

12. The method according to claim 11, wherein said receptacles are arranged in two rows, said cups are arranged in said first distribution pattern by being arranged in two rows, and said cups are arranged in said second distribution pattern by being arranged in two rows, with said cups in one row of said first distribution pattern and said cups in one row of said second distribution pattern being aligned with one another so as to define a first composite row of cups, and with said cups in the other row of said first distribution pattern and said cups in the other row of said second distribution pattern being aligned with one another so as to define a second composite row of cups, such that moving said cooling element in said second direction, thereby sequentially bringing corresponding ones of said cups arranged in said first distribution pattern into alignment with corresponding pick-up structure of a conveyor, and thereby subsequently sequentially bringing corresponding ones of said cups arranged in said second distribution pattern into alignment with corresponding pick-up structure of said conveyor comprises moving said cooling element in said second direction and thereby, during a first phase
(i) bringing said cups of said first composite row corresponding to said first distribution pattern into alignment with associated pick-up structure, and then
(ii) bringing said cups of said second composite row corresponding to said first distribution pattern into alignment with associated pick-up structure, and
during a subsequent second phase
(iii) bringing said cups of said first composite row corresponding to said second distribution pattern into alignment with associated pick-up structure, and then
(iv) bringing said cups of said second composite row corresponding to said second distribution pattern into alignment with associated pick-up structure, whereby moving said cooling element in a third direction and causing said first preforms in said corresponding ones of said cups arranged in said first distribution pattern to be seized by said corresponding pick-up structure associated with said corresponding ones of said cups arranged in said first distribution pattern, and subsequently causing said second preforms in said corresponding ones of said cups arranged in said second distribution pattern to be seized by said corresponding pick-up structure associated with said corresponding ones of said cups arranged in said second distribution pattern, comprises moving said cooling element in said third direction and during said first phase
(i) causing said first preforms, in said cups of said first composite row corresponding to said first distribution pattern, to be seized by the associated pick-up structure corresponding to said cups of said first composite row corresponding to said first distribution pattern, and then
(ii) causing said first preforms, in said cups of said second composite row corresponding to said first distribution pattern, to be seized by the associated pick-up structure corresponding to said cups of said second composite row corresponding to said first distribution pattern, and
during said subsequent second phase
(iii) causing said second preforms, in said cups of said first composite row corresponding to said second distribution pattern, to be seized by the associated pick-up structure corresponding to said cups of said first composite row corresponding to said second distribution pattern, and then
(ii) causing said second preforms, in said cups of said second composite row corresponding to said second distribution pattern, to be seized by the associated pick-up structure corresponding to said cups of said second composite row corresponding to said second distribution pattern.

13. The method according to claim 12, wherein
said collection element is horizontally arranged and said receptacles are in an upper surface of said collection element, inserting said collection element between said half-molds to receive said first preforms in said receptacles comprises rectilinearly moving said collection element between said half-molds, releasing said first preforms from one of said half-molds comprises releasing said first preforms from an upper one of said half-molds whereby said first preforms fall into said receptacles, respectively, transferring said collection element to a position adjacent said cooling element after said first preforms have been received within said receptacles comprises rectilinearly moving said collection element to a position lying substantially above said cooling element after said first preforms have been received within said receptacles, releasing said first preforms from said receptacles such that said first preforms are received within said cups arranged in said first distribution pattern comprises releasing said first preforms such that said first preforms fall into said cups arranged in said first distribution pattern;

inserting said collection element between said half-molds to receive said second preforms in said receptacles comprises rectilinearly moving said collection element between said half-molds, releasing said second preforms from said one of said half-molds comprises releasing said second preforms from said upper one of said half-molds whereby said second preforms fall into said receptacles, respectively, transferring said collection element to a position adjacent said cooling element after said second preforms have been received within said receptacles comprises rectilinearly moving said collection element to a position lying substantially above said cooling element after said second preforms have been received within said receptacles, moving said cooling element by an extent in a first direction such that said second preforms become aligned with said cups arranged in said second distribution pattern comprises moving said cooling element by the extent in a direction parallel to said first and second composite rows, releasing said second preforms from said receptacles such that said second preforms are received within said cups arranged in said second distribution pattern comprises releasing said second preforms such that said second preforms fall into said cups arranged in said second distribution pattern, and moving said cooling element in a third direction, orthogonal to said first direction and said second direction, comprises moving said cooling element upwardly.

14. The method according to claim 13, wherein
an amount of cups in said one row of said first distribution pattern is equal to an amount of cups in said other row of said first distribution pattern, and an amount of cups in said one row of said second distribution pattern is equal to an amount of cups in said other row of said second distribution pattern.

15. The method according to claim 14, wherein
said cups of said one row of said first distribution pattern in said first composite row are alternately arranged with respect to said cups of said one row of said second distribution pattern in said first composite row, and
said cups of the other row of said first distribution pattern in said second composite row are alternately arranged with respect to said cups of the other row of said second distribution pattern in said second composite row.

16. The method according to claim 12, further comprising:
between said first and second phases
(i) inserting said collection element between said half-molds;
(ii) releasing from said one of said half-molds third preforms, which have been injection molded in said mold, such that said third preforms are accommodated within said receptacles, respectively;
(iii) transferring said collection element to a position adjacent said cooling element; and
(iv) releasing said third preforms from said receptacles such that said third preforms are received within said cups arranged in said first distribution pattern.

17. The method according to claim 16, further comprising:
after said second phase
(i) inserting said collection element between said half-molds;
(ii) releasing from said one of said half-molds fourth preforms, which have been injection molded in said mold, such that said fourth preforms are accommodated within said receptacles, respectively;
(iii) transferring said collection element to a position adjacent said cooling element; and
(iv) releasing said fourth preforms from said receptacles such that said fourth preforms are received within said cups arranged in said second distribution pattern.

18. The method according to claim 17, further comprising:
during a third phase, causing said third preforms to be seized by pick-up structure of said conveyor, and then
during a subsequent fourth phase, causing said fourth preforms to be seized by pick-up structure of said conveyor.

* * * * *